(12) United States Patent
Rannoux et al.

(10) Patent No.: US 11,117,304 B2
(45) Date of Patent: Sep. 14, 2021

(54) PLASTIC BRACELET AND A METHOD OF MAKING

(71) Applicant: The Swatch Group Research and Development Ltd, Marin (CH)

(72) Inventors: Claire Rannoux, Geneva (CH); Blaise Poinsot, Le Mont-sur-Lausanne (CH); Nicolas Francois, Neuchatel (CH)

(73) Assignee: The Swatch Group Research and Development Ltd, Marin (CH)

( * ) Notice: Subject to any disclaimer, the term of this patent is extended or adjusted under 35 U.S.C. 154(b) by 0 days.

(21) Appl. No.: 16/589,295

(22) Filed: Oct. 1, 2019

(65) Prior Publication Data

US 2020/0108540 A1   Apr. 9, 2020

(30) Foreign Application Priority Data

Oct. 3, 2018 (EP) ...................................... 18198451

(51) Int. Cl.
| | |
|---|---|
| *B29C 48/12* | (2019.01) |
| *B29C 48/17* | (2019.01) |
| *A44C 27/00* | (2006.01) |
| *A44C 5/00* | (2006.01) |
| *B29L 31/00* | (2006.01) |

(52) U.S. Cl.
CPC ............ *B29C 48/12* (2019.02); *A44C 27/001* (2013.01); *B29C 48/17* (2019.02); *A44C 5/0053* (2013.01); *B29L 2031/722* (2013.01)

(58) Field of Classification Search
None
See application file for complete search history.

(56) References Cited

U.S. PATENT DOCUMENTS 5,507,685 A * 4/1996 Hoffman ................ B24B 31/02
134/7
2019/0022912 A1   1/2019 Rannoux et al.

FOREIGN PATENT DOCUMENTS

| | | |
|---|---|---|
| CN | 1520348 A | 8/2004 |
| CN | 1711626 A | 12/2005 |
| CN | 207824654 U | 9/2018 |
| FR | 890.112 | 1/1944 |
| FR | 992.105 | 10/1951 |

(Continued)

OTHER PUBLICATIONS

Nervous System Blog, Behind the Scenes: Polishing 3D Prints, Apr. 9, 2014, https://n-e-r-v-o-u-s.com/blog/?p=5168 (Year: 2014).*

(Continued)

*Primary Examiner* — Timothy Kennedy

(74) *Attorney, Agent, or Firm* — Oblon, McClelland, Maier & Neustadt, L.L.P.

(57) ABSTRACT

A method for manufacturing a bracelet made of synthetic material for watches or jewellery including at least one strand, the method including a step of making, by moulding or extrusion, a band of synthetic material intended to form at least one strand, the method being wherein it then includes a step of chemical mechanical polishing the band. A bracelet made of synthetic material for watches or jewellery includes at least one strand formed of an extruded or injection moulded band, wherein at least one strand has a roughness Rp less than or equal to 3 μm and preferably less than or equal to 2 μm.

12 Claims, 2 Drawing Sheets

(56) References Cited

FOREIGN PATENT DOCUMENTS

| FR | 2.121.864 | | 8/1972 |
|---|---|---|---|
| JP | 52-119358 | | 10/1977 |
| JP | 60-4463 A | | 1/1985 |
| JP | 3-79257 U | | 8/1991 |
| JP | 2005013697 A | * | 1/2005 |
| WO | WO 2017/118499 A1 | | 7/2017 |

OTHER PUBLICATIONS

Krishnan et al, Chemical Mechanical Planarization: Slurry Chemistry, Materials, and Mechanisms, Chem. Rev. 2010, 110, 178-204 (Year: 2010).*

Zhao et al, Chemical mechanical polishing: Theory and experiment, Friction 1(4): 306-326 (2013) (Year: 2013).*

Lee et al, Mechanical Aspects of the Chemical Mechanical Polishing Process: A Review, International Journal of Precision Engineering and Manufacturing vol. 17, No. 4, pp. 525-536, Apr. 2016 (Year: 2016).* https://raytech-ind.com/metal-finishing/adjusta-vibe-25ss.html (retrieved Dec. 31, 2020) (Year: 2020).* https://orchid.ganoksin.com/t/what-liquid-do-you-use-in-your-vibratory-tumblers/37489 (retrieved Feb. 22, 2021) (Year: 2009).*

European Search Report dated Mar. 25, 2019 in European Application 18198451.9, filed on Oct. 3, 2018 (with English Translation of Categories of Cited Documents).

Notice of the Reason for Refusal dated Dec. 1, 2020 in Japanese Patent Application No. 2019-169042 (with English language translation), 7 pages.

First Office Action dated Jan. 4, 2021 in corresponding Chinese Patent Application No. 201910921189.0 (with English translation)(13 pages).

* cited by examiner

PLASTIC BRACELET AND A METHOD OF MAKING

CROSS-REFERENCE TO RELATED APPLICATION

This application claims priority to European Patent Application No. 18198451.9 filed on Oct. 3, 2018, the entire disclosure of which is hereby incorporated herein by reference.

FIELD OF THE INVENTION

The present invention relates to a method for manufacturing by extrusion or moulding a watch or jewellery bracelet which has a perfect aesthetic finish at the end of its manufacturing process.

PRIOR ART

Nowadays, plastic bracelets are essentially made by moulding, either by injection or compression. These methods make possible the rapid mass production of such plastic objects with complex shapes and a controlled surface condition. However, bracelets made by moulding have an injection line along the entire length of the edge of the bracelet, which is an unattractive defect. Moreover, the moulding process requires expensive tools, which are all the more expensive because the object is complex. Further, if one wishes to obtain bracelets comprising different colours or materials, several overmoulding or bi-injection steps are required.

It was also proposed in FR Patent No. 2121864 and WO Patent No. 2017/118499 to make bracelets by an extrusion process which is a less expensive process for the mass production of parts. In particular, WO Patent No. 2017/118499 discloses a method for co-extrusion of materials of different colours and/or properties to make bracelets with more complex geometries and properties. However, the extrusion process has the drawback of producing defects on the side of the extruded band due to the passage and friction of the material through the die. These defects are visible to the naked eye, unpleasant to the touch and catch dirt more easily due to the surface roughness. Further, cutting the extruded band to form the bracelet strands produces unattractive, straight, non-rounded edges. Consequently, from a practical point of view, the use of this process is generally limited to the manufacture of objects for which aesthetic criteria are not important, such as, for example, dog collars or temporary wristbands in hospital settings.

SUMMARY OF THE INVENTION

It is an object of the present invention to overcome the aforecited drawbacks by proposing a bracelet manufacturing method that includes, after an extrusion and cutting step, or a moulding step, a step of chemical mechanical polishing the bracelet strands to reduce surface roughness and thereby obtain a perfect aesthetic finish.

Chemical mechanical polishing, also known as chemical mechanical polishing, vibratory finishing or mass finishing, makes it possible to obtain a surface that is very pleasant to the touch (ultra soft effect), by also removing the stickiness of certain materials after extrusion or injection. It also erases surface defects due to friction of the extrusion die on the material or to injection lines. It also makes it possible to obtain a material with improved resistance to soiling. Indeed, modifying the surface prevents dirt from clinging to the material: soiling resistance is improved and it is easier to remove dirt by washing. The polishing step also rounds the bracelet edges, after cutting or after moulding, which also enhances the aesthetic appearance of the bracelet.

In concrete terms, chemical mechanical polishing makes the surface of the material matt and thus homogenizes the roughness profile. The bracelet produced by the method thus has the characteristic of having a mean roughness Rp less than or equal to 3 µm, and preferably less than or equal to 2 µm.

Other features and advantages of the present invention will appear in the following description of preferred embodiments, given by way of non-limiting example, with reference to the annexed drawings.

DETAILED DESCRIPTION

The present invention relates to a method for manufacturing a watch or jewellery bracelet made of synthetic material and to the bracelet produced by the method. In a conventional manner, the bracelet includes one or two strands with, for example, a single strand in the case of a NATO design. The manufacturing method includes a chemical mechanical polishing step. Prior to this step, a band intended to form one or two strands of the bracelet is made. Preferably, the synthetic band is made by extrusion which is a process in which it is difficult to control surface condition. However, the present invention does not preclude making the band by moulding. The method thus includes, in succession, a step of making, by moulding or extrusion, a band of synthetic material intended to form one or two bracelet strands and a chemical mechanical polishing step of each strand. In the case of a moulding step, the band produced by the step has dimensions corresponding to those of the strand. In the case of an extrusion step, the band produced by this step is cut to size to obtain the bracelet strand or strands. Thus, for this preferred latter variant, the manufacturing method includes, in succession:

1. a step of extruding at least one synthetic material to form an extruded band,
2. a step of cutting the extruded band to obtain the bracelet strand or strands,
3. a chemical mechanical polishing step of each strand.

The extrusion step of the method consists in making a band whose width substantially corresponds to the width of the bracelet or whose width substantially corresponds to the length of one or both bracelet strands.

Figure 1:
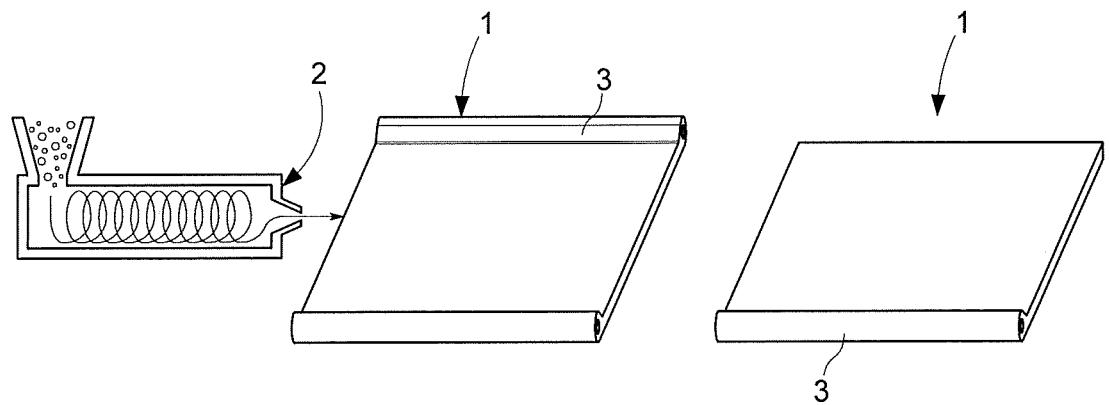
FIG. 1 represents a schematic view of two bands of different geometry from the extrusion line according to the method of the invention.
Figure 2:
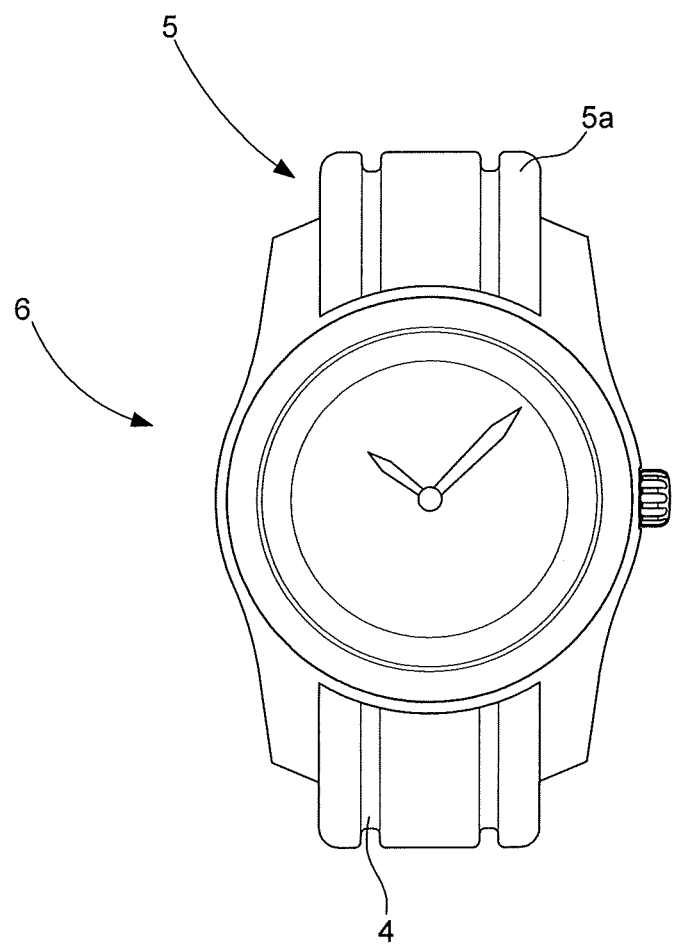
FIG. 2 represents a perspective view of a watch provided with a bracelet variant made by the method according to the invention.

The band made by moulding or extrusion may have a relief patter. It may also include areas that differ in colour and/or properties from the rest of the band. By way of example, in FIG. 1, for an extruded band, the band 1 has a width at the exit of die 2 that corresponds to the length of a strand with, at one or each of the lateral ends, a hollow tubular protruding structure 3 forming a through hole intended to receive a bar for attachment to a watch case. As another example, illustrated in FIG. 2, the extruded band may have a width at the exit of the die that substantially corresponds to the width of a strand 5a and include grooves 4 extending over the entire length of bracelet 5 of watch 6.

Figure 3:
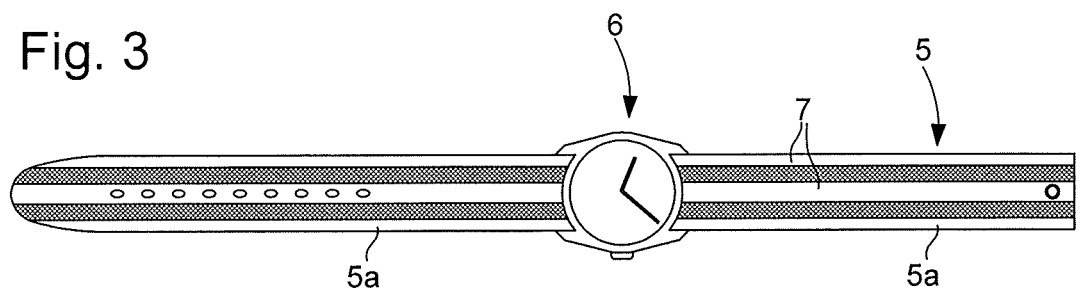
FIGS. 3 and 4 represent plan views of watches respectively provided with other variants of the bracelet made by the method of the invention.
Figure 4:
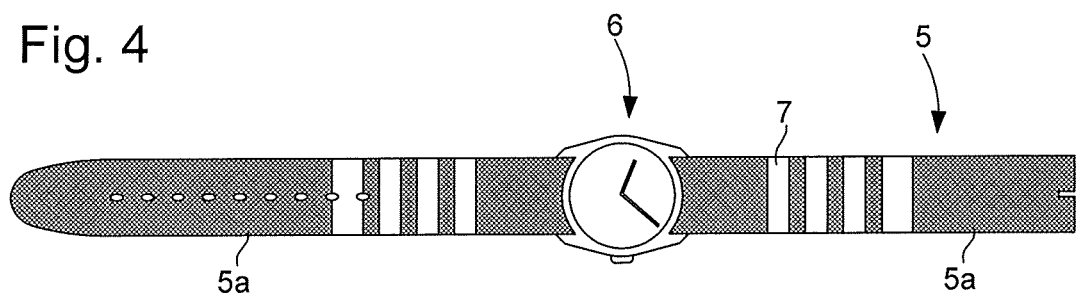

To obtain different colours and/or properties over the band, the extrusion step may consist of a step of co-extruding several materials. The extruded band can thus have strips of colours 7 which extend over bracelet 5 longitudinally or transversely, depending respectively on whether the extruded band has a width corresponding to the width of the strand (FIG. 3) or to the length of the strand (FIG. 4).

According to the invention, the synthetic materials used are mixtures containing at least one polymer elastomer with a hardness comprised between 55 and 90 Shore A and, preferably, between 60 and 75 Shore A, selected from among a thermoplastic elastomer (TPE), a silicone and a natural or synthetic rubber. Preferably, the mixture contains at least one TPE selected from the following list:

TPE-O—Thermoplastic olefins
TPE-S—More particularly, the styrene compounds SBS, SEBS or SEPS
TPE-V—More particularly vulcanized PP/EPDM or TPSi-V compounds (combination of thermoplastic and cross-linked silicone)
TPE-E—Copolyester compound
TPE-U—Thermoplastic polyurethane
TPE-A—Thermoplastic polyamide
Ionomer resins The step of cutting the extruded band to form the bracelet strands can be achieved by mechanical (stamping, and/or blades system), water jet, laser or ultrasonic cutting. It is also possible to cool the band prior to the cutting operation, in order to obtain mechanical properties more suited to the chosen method, and to limit burrs, for example.

The chemical mechanical polishing step consists in immersing the strands in an abrasive mixture in movement in the tank of a polishing machine which may be disc-polishing machine or vibrating type.

By way of example, the polishing is performed in a disc-polishing machine also called centrifugal disc finishing machine, with a rotational speed comprised between 100 and 400 rpm and preferably between 200 and 300 rpm, with treatment times comprised between 1 and 5 hours and preferably between 2 and 4 hours. The abrasive mixture includes chips which may be of different shapes (triangular, cylindrical, etc.) and made from different materials, such as ceramic, metal, organic material, such as corn or ground shells, or polymer, with an abrasive power that is adjusted according to the desired final appearance and the material of the strands. The mixture may also contain a chemical additive such as soap and/or an abrasive additive powder or paste intended to amplify the abrasive effect. The chemical mechanical polishing step makes the entire surface of the bracelet strands matt, i.e. in other words it homogenizes the height of the peaks. According to the invention, the value Rp, which is the maximum height of the protrusions of the roughness profile measured in accordance with standards ISO 4287:1997 and ISO 4288:1996, is less than or equal to 3 µm and preferably less than or equal to 2 µm. The maximum height of the protrusions is determined for each basic length analysed and averaged over all the basic lengths to obtain the aforementioned value. The polishing step also removes any defects linked to the shaping process (extrusion traces, for example) or cutting process (residual burrs, too straight edges, etc . . . ).

An example of manufacture according to the invention is given below. Two TPE-S compounds of different colours are co-extruded through a three dimensional die having a tubular profile at a lateral end. The extruded band produced by the die has a similar geometry to that of the band to the right of FIG. 1. The extruded band was cut by stamping to obtain a bracelet strand with straight edges. Then, the bracelet strand was polished in a centrifugal disc finishing machine for 3 hours with ceramic chips of triangular shape with average abrasive power, having a height and a width respectively of 8 mm (Spaleck Oberflächentech B8*8D) and a chemical additive of the soap type (Spaleck Oberflächentech nik D-670-U) at a speed of 260 rpm.

The roughness of the bracelet strand before and after polishing was analysed with an Altisurf 500 optical profilometer (ISO 4288:1996/4287:1997) over a surface of 3 mm*3 mm at a measuring speed of 250 µm/s, at a rate of one measurement per 1 µm. The values given below were obtained over thirty basic lengths of 0.8 mm and are the mean of the values obtained for each basic length. Before polishing, the surface has a roughness Rp of 3.4 µm. After polishing, roughness Rp is reduced to a value of 1.9 µm.

Soiling resistance was evaluated by the friction (1000 cycles) of a denim garment on the bracelet strands before and after polishing. The disgorging denim garment on the bracelet was observed before and after washing. It is noted that the polishing drastically reduces the formation of dirt on the bracelet and that it also facilitates washing.

KEY TO DRAWINGS (1) Band
(2) Extrusion line die
(3) Hollow tubular structure
(4) Groove
(5) Bracelet
(5a) Strand
(6) Watch
(7) Coloured strip

The invention claimed is:

1. A method for manufacturing a bracelet made of synthetic material for watches or jewellery comprising at least one strand, the method comprising:
    making, by extrusion, a band of synthetic material intended to form said at least one strand, the synthetic material containing at least one polymer elastomer with a hardness between 55 and 90 Shore A;
    cutting said band to form said at least one strand with straight edges; and
    polishing said at least one strand by immersing said at least one strand in an abrasive mixture in movement in a tank of a polishing machine to reduce a surface roughness of said at least one strand to have a mean roughness Rp less than or equal to 3 µm such that a surface of said at least one strand is matt and the straight edges are rounded.

2. The method according to claim 1, wherein the making the band is performed by extrusion and followed by cutting said band to form said at least one strand before the polishing.

3. The method according to claim 1, wherein the polishing is performed in a centrifugal disc finishing machine or vibrating type.

4. The method according to claim 1, wherein the polishing is performed in a centrifugal disc finishing machine, with a rotational speed between 100 and 400 rpm, and with a treatment time between 1 and 5 hours.

5. The method according to claim 1, wherein the abrasive mixture contains chips of ceramic, metal, organic material, or polymer.

6. The method according to claim 1, wherein the band produced by the extrusion or moulding includes relief areas and/or areas formed of materials having different colours and/or properties.

7. The method according to claim 1, wherein the band produced by the extrusion has a width that is equal to the width of said at least one strand.

8. The method according to claim 1 wherein the band produced by the extrusion has a width that is equal to the length of said at least one strand.

9. The method according to claim 1, wherein the polishing is performed in a centrifugal disc finishing machine, with a rotational speed between 200 and 300 rpm, and with a treatment time between 2 and 4 hours.

10. The method according to claim 1, wherein the abrasive mixture contains ceramic chips.

11. The method according to claim 1, wherein, after the polishing, said strand has a roughness Rp less than or equal to 2 μm.

12. The method according to claim 1, wherein said polymer elastomer is selected from a thermoplastic elastomer, a silicone, and a natural or synthetic rubber.

\* \* \* \* \*